United States Patent Office 3,738,944
Patented June 12, 1973

3,738,944
COMPOSITIONS FOR INITIATING OLEFIN POLYMERISATION AND THE USE THEREOF
John Paton Candlin, Frodsham, James Edward Maguire, Runcorn, and Ronald John Wyatt, Ashton, near Chester, England, assignors to Imperial Chemical Industries Limited, London, England
No Drawing. Filed Mar. 1, 1971, Ser. No. 119,894
Claims priority, application Great Britain, Mar. 3, 1970, 10,142/70
Int. Cl. B01j *11/84*
U.S. Cl. 252—431 R  6 Claims

ABSTRACT OF THE DISCLOSURE

A transition metal composition useful for polymerising olefins, which is formed by the reaction of (1) a material insoluble in organic solvent having surface hydroxyl groups free from adsorbed water; (2) a transition metal compound having at least one hydrocarbyl ligand, the transition metal being selected from those of Groups IV-A and V-A of the Periodic Table of Elements; and (3) a compound of a metal of Groups I to III of the said Periodic Table having at least one hydrocarbyl ligand. The composition is useful in the polymerisation and copolymerisation of olefinically unsaturated monomers, especially ethylene.

---

This invention relates to transition metal compositions useful for initiating olefin polymerisation and to their use, especially for the production of polyethylene.

The very many initiator systems which have been proposed for olefin polymerisation fall into one of two main groups. One group consists of free-radical initiators. The second, with which the present invention is concerned, involves compounds having metal-carbon bonds. One of the first initiator systems of the latter type to be described was that which is now known as the Ziegler system, as described in, for example, B.P. 819,867. A product formed by mixing a titanium halide with an aluminium alkyl is a typical initiator composition. These are dark materials, of indefinite formulae, and usually insoluble in organic solvents. When used to polymerise ethylene, the product generally needs to be treated to reduce metal and halogen residues. It has been considered advantageous to support the transition metal halide on a substrate such as silica (B.P. 969,761) and then to react this with an aluminium alkyl. The transition metal halo-compound is usually contacted with the support material in vapour phase or in hot liquid solution and consequently the initiator composition is difficult to control. The use of transition metal π-allyl compounds as olefin polymerisation initiators is also known (B.P.'s 1,058,680 and 1,165,958). These may be dissolved in organic solvents to form homogeneous initiator solutions which may be readily transferred by pumping. The compounds are, however, not very stable thermally and cannot be stored for long periods at room temperature. In our copending application No. 62,185 we described how this disadvantage may be at least partially offset by the technique of chemically reacting the π-allyl compound or other transition metal hydrocarbyl complex with a matrix material having a hydroxylic surface.

We have now devised initiator compositions, by the use of which some of the above mentioned disadvantages of the known systems may be reduced or even overcome.

According to our invention a transition metal composition useful for polymerising olefins is formed by the reaction of (1) A material insoluble in organic solvent having surface hydroxyl groups free from adsorbed water;
(2) A transition metal compound having at least one hydrocarbyl ligand, the transition metal being selected from those of Groups IV-A and V-A of the Periodic Table of Elements; and
(3) A compound of a metal of Groups I to III of the said Periodic Table having at least one hydrocarbyl ligand.

All references to the Periodic Table are to the version of the Periodic Table of the Elements printed inside the back cover of "Advanced Inorganic Chemistry," by F. A. Cotton and G. Wilkinson, 2nd edition, Interscience Publishers, 1966.

By "surface hydroxyl groups" we mean a plurality of —OH groups attached to the surface of the matrix material, the hydrogen atom of the —OH group being capable of acting as a proton source, that is, having an acidic function. Such a material will be substantially inert in that whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silica or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts of other suitable oxides, such as magnesium oxide and zinc oxide.

It is essential that the matrix material is freed from adsorbed water as this would merely react with and destroy the hydrocarbyl complex. The matrix materials may be readily freed from such adsorbed water by, for example, heating under vacuum at a temperature in the range 25 to 800° C. or in some cases, by azeotropic distillation.

The transition metal compound is a compound of a metal of Groups IV-A and V-A of the Periodic Table of the Elements in which the valency requirements of the metal are at least partially satisfied by one or more hydrocarbon groups.

Suitable hydrocarbon groups include alkyl and alkenyl groups (including π-alkenyl groups such as π-allyl) and substituted derivatives thereof. Examples of transition metal complexes include tetrakis (π-allyl) zirconium or hafnium, tetra(π-allyl) niobium tetrakis (π-methallyl) zirconium or hafnium, and zirconium tris(π-allyl)bromide.

A preferred class of organic transition metal complexes, many of which are particularly useful as polymerisation initiators, are those in which some or all of the said groups, are substituted alkyl groups of general formula

—CH$_2$Y  (1)

σ-bonded to the transition metal through the carbon atom as indicated. In this general formula Y represents an atom or group capable of interaction with the vacant d-orbitals of the metal. Preferably, all of the groups have this formula, but it is possible for some of them to comprise other hydrocarbon groups.

Suitable substituent groups Y include aromatic and polyaromatic groups such as phenyl and naphthyl, giving rise, in Formula 1 above, to the alkaryl ligands benzyl and (1-methylene-1-naphthyl) and ring substituted derivatives thereof, for example p-methyl benzyl.

Y may also be acycloalkenyl group, such as a cyclo-octenyl group.

Y may also comprise a group of general formula

Z(R)$_3$  (2)

where Z represents silicon, germanium, tin or lead, and R represents a hydrocarbon group or hydrogen; but is preferably an alkyl group.

Y may also be a halogen.

Examples of this preferred class of transition metal complexes include zirconium and titanium tetra(benzyl), tris-(benzyl)zirconium chloride, zirconium tetrakis (p-methyl benzyl), zirconium and titanium tetrakis(1-methylene-1-naphthyl) and zirconium tetrakis(trimethylsilylmethylene).

Examples of halogenated compounds include tris($\pi$-allyl)zirconium chloride, bromide or iodide and the equivalent $\pi$-methallyl and benzyl compounds.

Compounds of metals of Groups I to III having at least one hydrocarbyl ligand are well known and include organometallic compounds of the type used in Ziegler polymerisation processes. Preferred metals are lithium, sodium, potassium, beryllium, magnesium, calcium, zinc, boron, aluminium or gallium. Typical hydrocarbyl ligands are methyl, ethyl, vinyl, propyl, butyl, hexyl, cetyl, cyclohexyl, phenyl, benzyl and naphthyl. Also present to satisfy valency requirements of the metal may be other ligands such as hydride, halide or alkoxy, e.g. methoxy or ethoxy. More than one metal may be present, as in mixed metal compounds. Particular compounds which may be mentioned are methyl, ethyl and propyl sodium and potassium; divinyl magnesium; diethyl zinc; and Grignard reagents, such as methyl magnesium bromide. Of considerable importance are aluminium compounds of the general formula $$Al_2R_nX_{6-n}$$

where R is hydrocarbyl, X is halide or alkoxy and $n$ is an integer from 0 to 6. Examples are trimethyl, triethyl, tripropyl and trihexyl aluminium, dialkyl, especially diethyl, aluminium halides, monoethyl aluminium dihalides and the so-called sesquihalides where $n=3$.

Compositions useful as polymerisation initiators are obtained when either the transition metal compound or the compound of the Group I to III element are first contacted with the hydroxylic material, followed by the other component, though the polymerisation activity may not be the same in each case.

The compositions are conveniently prepared by suspending the hydroxylic material in an inert solvent and then adding, in solution, either or both of the metal compounds. It is preferred, however, to add the transition metal compound first. The reaction is carried out under dry and oxygen free conditions. Hydrocarbon solvents containing from 4 to 18 carbon atoms per molecule, such as pentane, hexane, heptane, saturated petroleum fraction is discharged from the solvent media. When all the solvents may also be used. One of the advantages of the present invention is that the compositions may be prepared at low temperatures, allowing better control of the reactions and hence more reproducible initiators.

The ratio of the metal compounds to surface hydroxyl groups may be varied within wide limits, and unreacted hydroxyl groups may be allowed to remain on the support material. If the transition metal compound is added first, progress of its reaction with the hydroxylic material may be readily followed. The transition metal compound are mostly strongly coloured. On reaction with the hydroxylic surface the latter becomes coloured (usually different) and the colour of the transition metal compound solution is discharged from the solvent media. When all the surface hydroxyl groups have reacted, the supernatant solution becomes permanently coloured, indicating complete reaction. Alternatively, the concentration of surface hydroxyls may be determined using an organometallic compound such as methyl magnesium iodide. The volume of methane liberated corresponds to the number of hydroxyl groups present and sufficient transition metal compound is subsequently added to a second equal amount of fresh hydroxylic material to react with these.

For more detailed information regarding the reaction of the transition metal hydrocarbyl with the surface hydroxyls and the nature of the resulting products, reference should be made to our aforementioned co-pending application.

A similar procedure may be used when the Group I to III compound is added first since these are usually colourless.

After the first compound has been reacted with the hydroxylic surface, the second compound is added. A further colour change may be noted. The amount of the second compound is preferably sufficient to give an atomic ratio of transition metal: Group I to III element in the range 1:0.1 to 1:100, more preferably 1:1 to 1:10.

When our compositions are prepared by reaction of the hydroxylic material with the transition metal compound before the Group I to III compound it is possible to modify the composition at the intermediate stage (before the addition of the Group I to III compound) by reaction with a free halogen or covalently bound halogen containing compound, including hydrogen halides and organic halogen containing compounds. Examples of the last group are allyl chloride, allyl bromide, triphenyl methyl chloride or bromide, propyl bromide, 1,2-dibromopropane, carbon tetrachloride, propargyl bromide and benzyl chloride. Preferably, sufficient halogen or halogen containing compound is added such that 1 to 5 atoms of halogen are added per atom of transition metal. Preparation of the composition is then completed by addition of the Group I to III compound.

These modified intermediate compositions produced are thermally stable and may be stored under dry conditions, preferably in the presence of a supernatant liquid at room temperature until the required addition of Group I to III compound is made.

According to a further aspect of our invention, olefinically unsaturated monomers are polymerised by contact with a composition of the type described.

The term "olefinically unsaturated monomer" is intended to include mono-olefins such as ethylene, propylene and 4-methylpentene-1, di-olefins, such as butadiene, and certain polar vinyl monomers, such as vinyl chloride. However, it will be appreciated that not all composition of the type defined above will necessarily polymerise all the above mentioned monomers; but the best monomer/composition combinations may be readily established by simple experiment, as will appear from experimental details set out below. In particular it may be mentioned that some vinyl monomers, e.g. vinyl acetate, react non-catalytically with our compositions and thus may not be polymerised using our initiators.

Our compositions may also be used to initiate the copolymerisation of two or more olefinically unsaturated monomers. For example, ethylene may be copolymerised with a small amount of propylene, butene, hexene or decene, butadiene or styrene.

The process is especially suitable for polymerising and copolymerising ethylene to high molecular weight polymers.

The olefin may be contacted with the dry composition, but it is preferable to include the supernatant liquid from the preparation process.

The polymerisation activity is generally such that no subsequent treatment of the polymer is required to remove metal residues, especially when the transition metal compound is a titanium or zirconium compound.

An advantageous method of carrying out the polymerisation process is to use an initiator prepared as described in which the transition metal compound and the Group I to III compound are both halogen-free. Preferably, both compounds contain only metal and hydrocarbyl ligands. Examples of such compounds are tetrakis ($\pi$-allyl) or tetrakis(benzyl) titanium or zirconium; and aluminium trialkyl.

Polymerisation processes according to our invention may be carried out by techniques generally used for free radical initiated polymerisation or for polymerisation process of the type using Ziegler catalysts.

The choice of conditions of pressure and temperature will vary with factors such as the nature of the monomer and initiator, and whether bulk or diluent polymerisation is used.

For example, when ethylene is polymerised, pressures from sub-atmospheric to several thousand atmospheres may be used. Low pressure (say from 0.1 to 30 atmospheres) and intermediate pressure (say from 30 to 300 atmospheres) polymerisations may be carried out using conventional equipment; but very high pressure polymerisation must be performed using suitable specialised reactors and pumping equipment. However, since, generally speaking, the higher the pressure the higher the activity, the use of such techniques is often justified. If very high pressures are used, it is preferred that conditions are such that the ethylene feed and polyethylene produced are maintained in a single fluid phase, i.e. the pressure should exceed 500 kg./cm.$^2$, preferably 1000 to 3000 kg./cm.$^2$, and the temperature should be greater than 125° C., say 140–300° C. This type of process is usually operated in a continuous manner. In order that the composition may be pumped successfully, it is imperative that the matrix should be as finely divided as possible to enable it to pass through the very fine mesh filters commonly interposed before the pumps. This may be achieved by reducing the particle size of the matrix material before or after treatment with transition metal complex; but if it is done after treatment rigorous precautions must be taken to exclude air and moisture. Any suitable method of comminution may be used; but the use of an ultrasonic dispersion technique has been found to be particularly satisfactory.

A wide range of temperatures may be used, but in general low and intermediate pressure ethylene polymerisations are carried out at temperatures in the range 50–160° C.

When the process of our invention is used to polymerise propylene, it is preferred to operate under conditions commonly used for the polymerisation of propylene. However, polymerisation of propylene under other conditions, e.g. high pressure, is not excluded.

It is also within the scope of our invention to use our compositions to initiate the copolymerisation of ethylene and propylene together and/or with other olefinically unsaturated monomers.

Except for the polymerisation of ethylene at high pressure, the reaction may be carried out in the liquid or gaseous phase. However, it is preferred that the monomer is used in liquid form and therefore, if it is not liquid under the polymerisation conditions, it is preferred to dissolve it in a suitable solvent. Examples of suitable solvents are aliphatic or aromatic hydrocarbons; for instance pentane, hexane, heptane, octane, decane, benzene, toluene and mixtures thereof.

Chain transfer agents may be used in polymerisations according to our invention, and when ethylene is polymerised, their use is normally desirable as the polyethylene produced is of very high molecular weight. Hydrogen may be conveniently used in accordance with usual practice. However, some solvents may act as chain transfer agents.

Our process is preferably effected under an atmosphere free of oxygen, for example under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the initiators.

It has been found that in many instances our compositions are unexpectedly active in the polymerisation of olefinically unsaturated monomers, particularly ethylene. The activity of the composition is frequently many times greater than that of the transition metal complex which is used in its preparation.

The invention is illustrated by the following examples.

EXAMPLE 1

Hydrated precipitated silica (10 g.) having a particle size in the range 15–20 millimicrons was refluxed for 2 hours under nitrogen with (200 ml.) xylene removing the water by a Dean-Stark apparatus. A pentane solution of tetrakis($\pi$-allyl)zirconium (4 millimoles) in pentane was added to the ice cold xylene suspension of silica with stirring, the supernatant liquid becoming colourless. Dry HCl gas was passed through the ice-cold stirred solution until the suspended solid changed from dark green to pale yellow/brown (about 15 minutes). Dry nitrogen gas was then passed through the stirred suspension until the supernatant liquid was chloride ion free (i.e. no precipitate formed with acidified aqueous silver nitrate). Analysis of the solid gave an atomic ratio of zirconium:chloride of 1:2.

An aliquot of this suspension, corresponding to 0.2 mM. zirconium, was added to a stirrable autoclave in which had been added dry, oxygen-free toluene (500 ml.) containing triethyl aluminium (2 mM.). A mixture of ethylene (10 kg. cm.$^{-2}$), and hydrogen (10 kg. cm.$^{-2}$) and the stirrer started. Ethylene was added over 1 hour to maintain the pressure at 20 kg. cm.$^2$. The yield of the polymer, after drying, was 94 g. corresponding to an activity of 47 g. polymer/m. atom transition metal/kg. cm.$^{-2}$ ethylene/hour. Hereinafter activities will be quoted as simple numbers, the units being understood to be the same as above.

By way of comparison, an initiator suspension was prepared in a manner similar to that described in B.P. 969,766. Thus, zirconium tetrachloride (0.868 g.) was added to an azeotroped suspension of the above mentioned silica (9.35 g.) giving a ratio of 4 mM. zirconium per 10 g. silica. The zirconium:chloride atomic ratio was 1.77:1. An aliquot of this suspended catalyst containing 0.5 mM. zirconium was treated with triethyl aluminium (5 mM.). Ethylene was introduced and the polymerisation commenced in a manner described above. After 1 hour 14.8 g. of polymer, which corresponds to an activity of 3.0.

EXAMPLE 2

An initiator was prepared as described in Example 1, with the difference that the aluminium:zirconium ratio was altered to 1:1, 0.2 mM, triethyl aluminium and 0.2 mM. supported zirconium. 37 g. polymer was produced corresponding to an activity of 18.5.

EXAMPLES 3–5

The initiator preparation and polymerisation of Example 1 was repeated using triethyl aluminium/zirconium atomic ratios of 2:1, 5:1 and 20:1. The activities of the resultant initiators were 25, 46 and 47.

EXAMPLE 6

An initiator was prepared by the procedure of Example 1. A sample of the slurry containing 0.2 mM. zirconium was reacted with diethyl aluminium chloride (2 mM.) and the polymerisation procedure of Example 1 was repeated. The yield of polymer after 1 hour was 10 g., corresponding to an activity of 5.

EXAMPLE 7

Hydrated silica (5 g.) was refluxed under a nitrogen atmosphere for 2 hours with xylene (100 ml.) in a Dean-Stark apparatus to remove surface water. To the ice-cooled mixture tetrakis(benzyl) titanium (1.9 mM.) dissolved in pentane was added with stirring, until the red colouration of the solution was discharged. An aliquot of this suspension containing 0.2 mM. titanium was admitted to an autoclave and reacted with 2mM. triethyl aluminium and a ethylene/hydrogen mixture as described in Example 1. After 1 hour, a total of 57.4 g. polyethylene was isolated, corresponding to an activity of 28.7. The polyethylene had a melt flow index of 0.26.

By comparison, 0.2 mM. tetrabenzyl titanium and 2 mM. triethyl aluminium mixed together without the support, i.e. under the conditions of a normal Ziegler process produced less than 10 g. polymer under similar conditions.

EXAMPLE 8

The initiator preparation and polymerisation of Example 1 was repeated using an aliquot corresponding to 0.5 mM. zirconium and an aluminium:zirconium ratio of 10:1, the ethylene and hydrogen being replaced by propylene (23 kg. cm.$^{-2}$). After 2 hours, 6.48 g. of polypropylene had been produced. The chlorine:zirconium ratio of the catalyst was 3.08:1.

EXAMPLES 9–12

High purity γ aluminium was treated by heating in air at 900° C. for 15 hours, refluxing with water for 15 hours followed by drying at (A) 500° C. or (B) 750° C. for 2 hours in an atmosphere of nitrogen.

10 g. of the pretreated alumina was suspended in dry, oxygen-free toluene (50 ml.) at room temperature. A toluene solution of zirconium or titanium tetra benzyl (2.0 mM.) was added to a suspension of treated alumina with stirring, the supernatant liquid becoming colourless. Dry HCl gas was passed through the suspension at room temperature for about 15 minutes. The suspended solid was then allowed to settle and the supernatant liquid removed by means of a syringe. The remaining solid was subjected to vacuum to remove the rest of the HCl. The solid product was suspended in dry, oxygen-free toluene. This procedure resulted in a series of suspensions, each containing alumina treated by procedure (A) or (B) and either zirconium or titanium tetra benzyl. An aliquot, equivalent to 0.2 millimole of transition metal, was taken from each solution and subjected to the polymerisation procedure of Example 1, the aluminium:transition metal ratio being 10:1. The results are given in Table 1.

TABLE 1

| Example: | Transition metal (M) | Al$_2$O$_3$ treatment | Cl$_2$M ratio | Yield (g) | Activity |
|---|---|---|---|---|---|
| 9 | Zr | A | 4.9:1 | 104 | 52 |
| 10 | Ti | A | 4.8:1 | 116 | 58 |
| 11 | Ti | B | ------ | 136 | 68 |
| 12 | Zr | B | ------ | 80 | 45 |

EXAMPLE 13

The polymerisation of Example 9 was repeated with 10.5 kg. cm.$^{-2}$ of propylene instead of ethylene and hydrogen, the aliquot taken being equivalent to 0.3 millimole of zirconium. After 3 hours 23.9 g. of polypropylene had been produced.

EXAMPLE 14

The general procedure of Example 9 was repeated using niobium tetrakis(π-allyl)/Al$_2$O$_3$ (pretreatment A) initiator composition. After 1 hour 40 g. of polyethylene was produced.

What is claimed is:

1. A transition metal composition useful for polymerising olefins, which is formed by mixing together under dry and oxygen-free conditions (1) an inert inorganic material insoluble in organic solvent having surface hydroxyl groups free from adsorbed water; (2) a transition metal compound having at least one π-allyl or -2-methallyl ligand, with any remaining valence requirements for said compound being satisfied by halide, the transition metal being selected from those of Groups IV–A and V–A of the Periodic Table of Elements; and (3) a compound of a metal of Groups I to III of the said Periodic Table having at least one hydrocarbon ligand with any remaining valence requirements being satisfied by halide, hydride or alkoxy.

2. A composition as claimed in claim 1 in which the compound of a metal of Groups I to III is aluminium triethyl.

3. A composition as claimed in claim 1 in which the insoluble material is silica or alumina or a mixture thereof.

4. A process for the preparation of a composition as claimed in claim 1 in which the transition metal compound and insoluble material are first reacted together to form an intermediate composition and the compound of a metal of Groups I to III is subsequently reacted with the said intermediate composition.

5. A process as claimed in claim 4 in which the said intermediate composition is halogenated by reaction with a free halogen, hydrogen halide or halogenated hydrocarbon before reaction with the compound of a metal of Groups I to III.

6. A process as claimed in claim 5 in which the amount of free halogen, hydrogen halide or halogenated hydrocarbon used in sufficient to add from 1 to 5 halogen atoms to the composition per atom of transition metal.

References Cited

UNITED STATES PATENTS

| 3,326,877 | 6/1967 | Orzechowski et al. | 252—431 R X |
| 3,392,160 | 7/1968 | Orzechowski | 252—429 R X |
| 3,424,777 | 1/1969 | Wilke | 252—431 R X |
| 3,536,740 | 10/1970 | Wilke | 252—431 R X |
| 3,635,935 | 1/1972 | Long | 252—431 R |
| 3,654,254 | 4/1972 | Job et al. | 252—431 R |
| 3,663,451 | 5/1972 | Hill | 252—431 R |

PATRICK P. GARVIN, Primary Examiner

U.S. Cl. X.R.

252—429 B; 260—88.2, 93.7, 94.9 D